(12) United States Patent
Kurumida

(10) Patent No.: US 7,058,604 B2
(45) Date of Patent: Jun. 6, 2006

(54) METHOD FOR ISSUING INSTALLATION KEY AND SYSTEM THEREOF

(75) Inventor: Tsuneaki Kurumida, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 202 days.

(21) Appl. No.: 09/909,820

(22) Filed: Jul. 23, 2001

(65) Prior Publication Data

US 2002/0066032 A1 May 30, 2002

(30) Foreign Application Priority Data

Jul. 27, 2000 (JP) .............................. 2000-227860

(51) Int. Cl.
*G06F 17/00* (2006.01)

(52) U.S. Cl. ........................... 705/50; 705/51; 705/59; 713/189; 713/201; 713/202; 380/277

(58) Field of Classification Search .................. 705/51, 705/59; 713/189, 201, 20; 380/277
See application file for complete search history.

(56) References Cited

U.S. PATENT DOCUMENTS

| | | | |
|---|---|---|---|
| 6,005,935 A | 12/1999 | Civanlar | 380/4 |
| 6,067,622 A * | 5/2000 | Moore | 713/200 |
| 6,075,862 A * | 6/2000 | Yoshida et al. | 380/28 |
| 2001/0032314 A1 * | 10/2001 | Ansper et al. | 713/176 |
| 2002/0178370 A1 * | 11/2002 | Gurevich et al. | 713/189 |
| 2003/0140007 A1 * | 7/2003 | Kramer et al. | 705/40 |
| 2005/0171847 A1 * | 8/2005 | Ling | 705/14 |

FOREIGN PATENT DOCUMENTS

JP 10-240520 9/1998

* cited by examiner

*Primary Examiner*—Firmin Backer
(74) *Attorney, Agent, or Firm*—Fitzpatrick, Cella, Harper & Scinto

(57) ABSTRACT

A user who intends to install software notifies the sales company of such software of the user's own credit card information. Then, the software sales company communicates such credit card information to the credit company to request the confirmation thereof. If the credit company confirms the user to be the legitimate user, the software sales company produces the installation key uniquely corresponding to the user in accordance with the credit card information for issuing it to the user. When the user inputs the installation key thus issued and the credit card information into an installer. The installer produces an installation key from the credit card information. If the installation key thus produced and the installation key thus inputted are in agreement, the installer executes installation, hence determining the legitimate use of software by avoiding the problems to be encountered in processing software or analyzing it, while coping with the replacement of computers due to out of order or the like.

3 Claims, 6 Drawing Sheets

METHOD FOR ISSUING INSTALLATION KEY AND SYSTEM THEREOF

BACKGROUND OF THE INVENTION

1. Field of the Invention

The present invention relates to the installation of a software. More particularly, the invention relates to a method for issuing installation key and the system thereof.

2. Related Background Art

For the conventional method for installing a software, there is the one called the key input method.

A first method thereof is, in general, such as to notify the user of the ID by attaching a seal having a specific ID to a package of a CD-ROM or the like when software is sold, and then, when the user inputs such ID by means of keys for installation, the legality of the use of the software is determined in accordance with the ID thus inputted.

Also, as a second method, there is the font installer of TypeOnCall of Adobe Systems. Here, the installer generates the ID that identifies a personal computer. The user contacts a sales company on this ID and receives the installation ID for the payment thereof. With this installation ID being key inputted into the installer, fonts or software can be installed on that particular computer.

Also, as a third method, there is the one disclosed in the specification of Japanese Patent Laid-Open Application No. 10-240520. This system is arranged to determine the legality of use by burying personal information, such as a credit card number, in a software, which is compared with the key input, and if identified successfully, the installer keeps it and performs installation.

However, for the conventional first method described above, IDs are changed per user by means of the attachment of a seal or the like having the ID printed thereon. If this ID should be widely known through network or the like, the system becomes insufficient in function as means for determining the legality of use. It becomes subjected to the invitation of irregular software use by non-authorized users with ease.

Also, for the conventional second method described above, such key is issued for a personal computer, and only on a specific computer, the installation is possible. Third method is good enough for the legitimate use for a specific computer. However, should such designated computer be in trouble to necessitate the use of some other computer, the same key is no longer useful for installation. In such a case, there is a need for reissuing some other key to serve the purpose.

Also, for the conventional third method described above, while processing the data in software so as to bury personal information, such as a credit card number, in the software, there is a possibility of the leakage of personal information should the software be analyzed. There is encountered a problem with respect to the aspect of maintaining the security in this respect.

SUMMARY OF THE INVENTION

Now, therefore, it is an object of the present invention to provide the system of issuing an installation key for software, which is capable of determining the legitimate use satisfactorily, and also, executable by the same procedures without depending on any designated computer, as well as to provide a method for issuing an installation key for software.

Also, it is another object of the invention to provide the system of issuing an installation key for software, which is capable of minimizing the possibility of the leakage of personal information used for determining the legitimate use of the software, as well as to provide a method for issuing an installation key for software.

According to one aspect, the present invention which achieves these objectives relates to a method for issuing an installation key to a software user for installing software on a computer, which comprises the steps of notifying from the user to a sales company of the ID information thereof; communicating the notified ID information to an authorizing agency form the sales company to request the confirmation of the user having notified the ID information; confirming the user in the authorizing agency in accordance with the notified ID information to communicate the result of confirmation to the sales company; and producing in the sales company an installation key uniquely corresponding to the user on the basis of the ID information for issuing the installation key to the user if the user is confirmed by said authorizing agency to be the legitimate user.

According to another aspect of the present invention which achieves these objectives related to a system for issuing an installation key for installing software on a computer which comprises means for acquiring ID information from a user; means for communicating the acquired ID information to an authorizing agency to confirm the user having notified the ID information; and means for producing an installation key uniquely corresponding to the user in accordance with the ID information for issuing the installation key to the user if the user is confirmed by the authorizing agency to be the legitimate user.

According to still another aspect, the present invention which achieves these objectives relates to a program of installation key issuance for controlling a computer to issue an installation key for installing software on a computer, which comprises the codes for causing the computer to perform a step of acquiring ID information from a user; a step of communicating the acquired ID information to an authorizing agency to confirm the user having notified the ID information; and a step of producing an installation key uniquely corresponding to the user in accordance with the ID information for issuing the installation key to the user if the user is confirmed by the authorizing agency to be the legitimate user.

According to a further aspect, the present invention which achieves these objectives relates to an installing method for installing software on a computer system which comprises the steps of displaying the installation screen of software by actuating an installer; inputting the installation key issued by a sales company and the ID information of the computer user into the input columns on the installation screen; and producing a key uniquely corresponding to the computer user in accordance with the ID information for comparison with the installation key, and executing the installation of software if these are in agreement.

According to a further aspect, the present invention which achieves these objectives relates to an installation program for controlling the computer of a computer system for installing software which comprises the codes for causing the computer to perform a step of displaying the installation screen of software; a step of inputting the installation key issued by a sales company and the ID information of the computer user into the installation screen; and a step of producing a key uniquely corresponding to the computer user in accordance with the ID information for comparison with the installation key, and executing the installation of the software if these are in agreement.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Hereinafter, with reference to accompanying drawings, the detailed description will be made of one preferred embodiment in accordance with the present invention.

Figure 1:
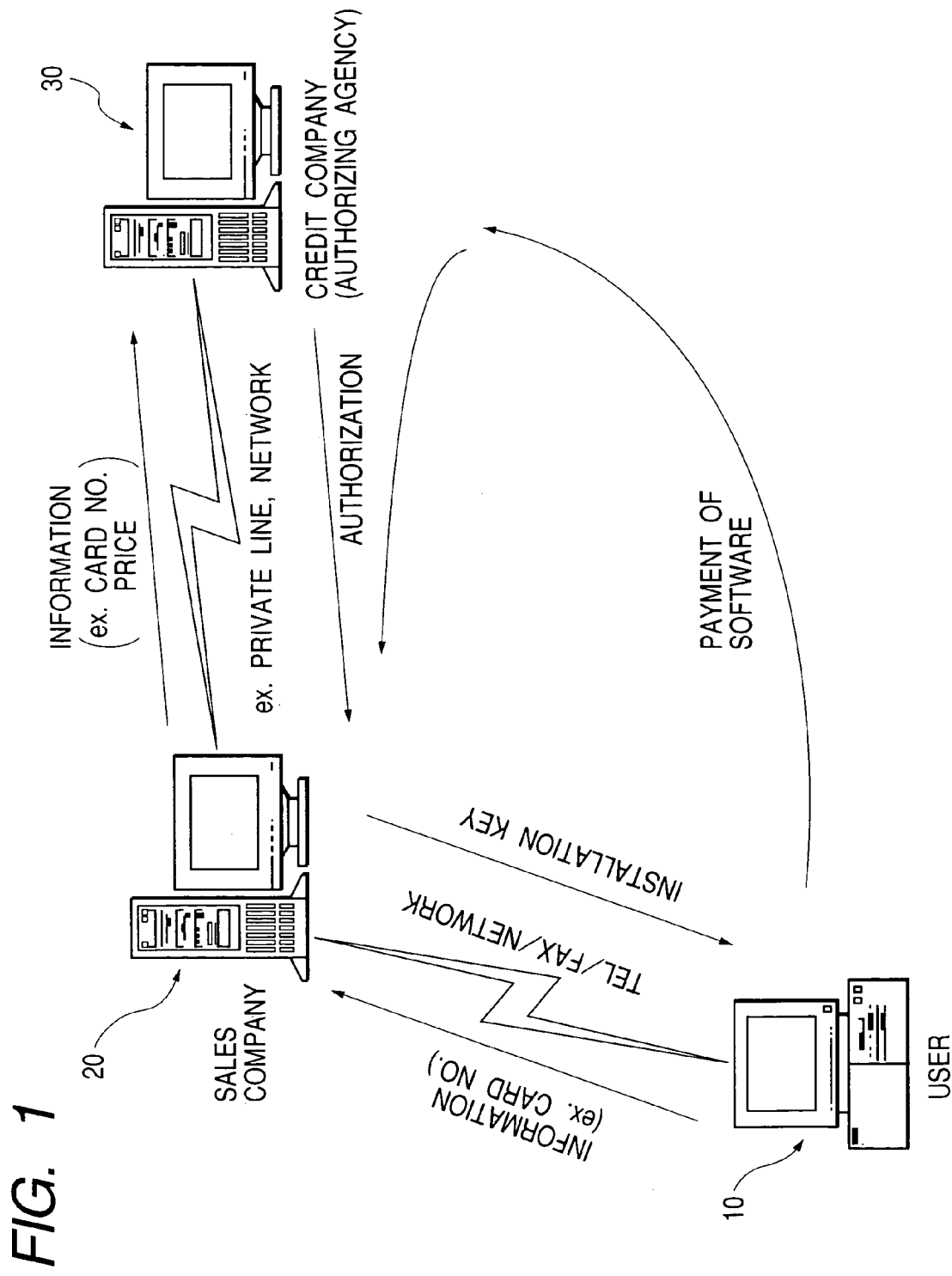
FIG. 1 is a structural view which shows a system for issuing installation key for a software, and an installation system in accordance with one embodiment of the present invention.

FIG. 1 is a view which illustrates the communication mode between a software user and a software sales company, and the systematic structure of payment of the software fees.

A computer system (PC) 10 used by a software user, a computer system 20 used by a software sales company, and a computer system 30 used by a credit company should preferably be connected with each other by a network (not shown) to form the system embodying the present invention. It is possible to adopt for these systems a computer of known structure such as comprising a CPU; a ROM serving as a main storage device; a HDD and a FDD serving as auxiliary storage devices; an RAM serving as the work area for the CPU and a provisional data storage area; a communication I/F used for exchanging data with the outside; a key board and a mouse serving as input devices; and a CRT display (or a liquid crystal display) as image indication device.

The computer system 20 and the computer system 30 can be connected on line as a private line. Here, the computer system 10 and the computer system 20 are not necessarily made executable on line. It should be good enough if only the software user and the software sales company can communicate with each other on required information by use of a telephone, a facsimile equipment, or some other communication set up.

With the mutual communications of the kind, the software user presents to the software sales company the credit information which will be describe later. Then, when the computer system 20 recognizes the input of such information, the computer system 20 issues installation keys, which are notified from the software sales company to the software user. Thus, only when the information notified to the software user is inputted into the computer system 10, it becomes possible to instal that particular software.

The payment of the software is charged by the credit company directly to the bank account or the like (not shown) of the software user. The sales company transmits the payment to the software sales company after deducting a commission.

Now, with reference to FIG. 2, the description will be made of the features of the issuance procedures of an installation keys in accordance with the system that adopts the mode described above.

The user cannot install a software or use it unless he is provided with installation keys even if he has already secured the software by means of a CD-ROM or by delivery or the like using on line. At first, therefore, the user requests the software sales company of the issuance of keys using the communication set up (S201). Here, more specifically, the credit information, such as the credit card number of a credit card issued by the credit company; the name of the credit card holder indicated alphabetically; and the validity of the credit card to be used, is notified. These items of credit information verify that the user has been approved by the credit company to use such credit card.

Next, the software sales company inputs the credit information thus notified and the sales price of the software in the computer system 20 to communicate on line with the computer system 30 of the credit company who is the authorizing agency, and requests the credit company to confirm whether or not the user is a legitimate user of the card (S202).

The computer system 30 of the credit company determines the validity of the card by identifying the user of the credit card. Then, in accordance with the validity thus confirmed and the limit of payment established in advance against the amount of sales, the use of the credit card is authorized. Then, with the authorization, the use thus approved is notified to the computer system 20 of the software sales comply by use of on line communication (S203).

The soft sales company can confirm the user on the bases of the approval of the credit company given to the use of the card. The computer system 20 works out a calculation as described later in accordance with the credit information, such as the confirmed credit card number, holder's name, and validity, and then, produces installation keys formed by alphanumeric characters in 12 digits, for example, (S204). The software sales company issues such installation keys and notifies the user accordingly by use of the aforesaid communication set up (S205).

Figure 3:
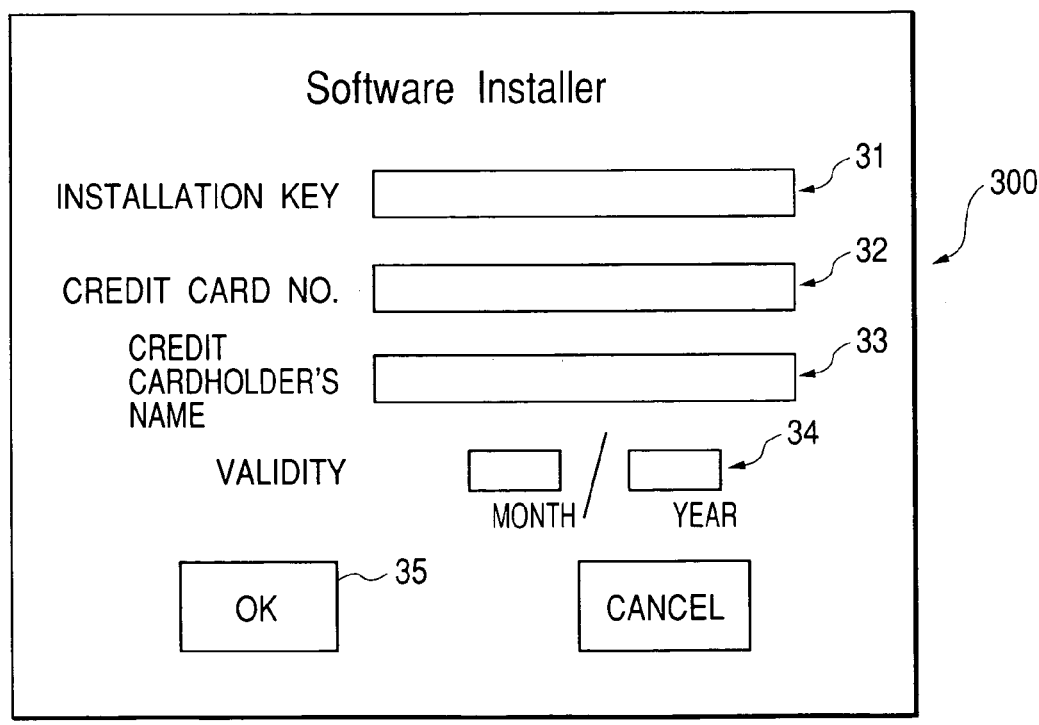
FIG. 3 is a view which shows an installer input displayed on a screen.

Receiving the installation keys thus issued from the software sales company, the user can actuate the installer for the intended installation. In other words, on the installation input display on a screen 300 as shown in FIG. 3, the respective items of the credit information, the installation keys 31 thus received; the credit card number 32; the name 33 of the credit card holder; and the validity 34 given to the use of the card, are inputted in each of the designated columns, and then, the execution button 35 is clicked (S206). Thus, the installation is performed in accordance with the procedures to be described later (S207).

Figure 2:
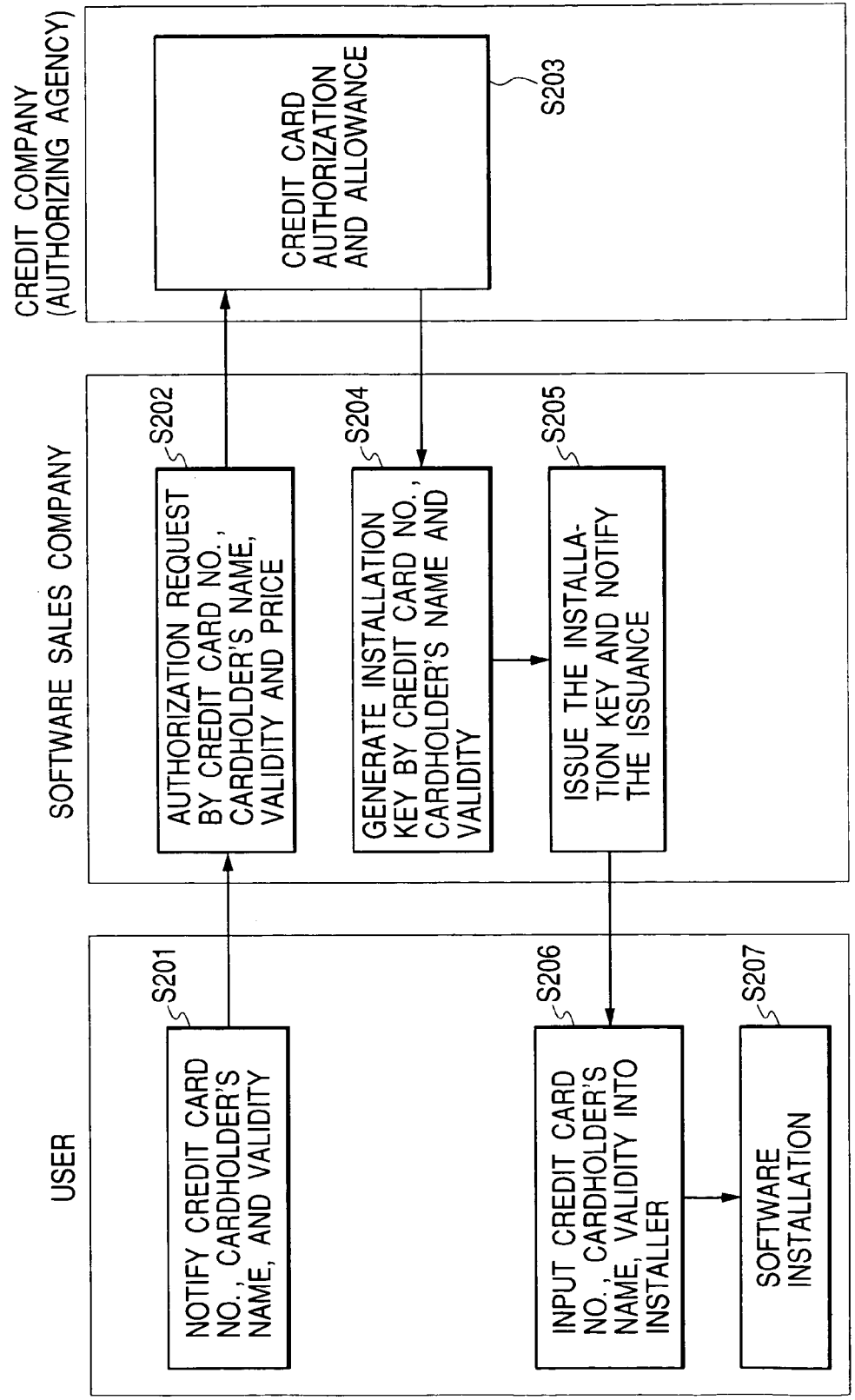
FIG. 2 is a view which shows the issuance of software installation keys, and the installation procedures.
Figure 4:
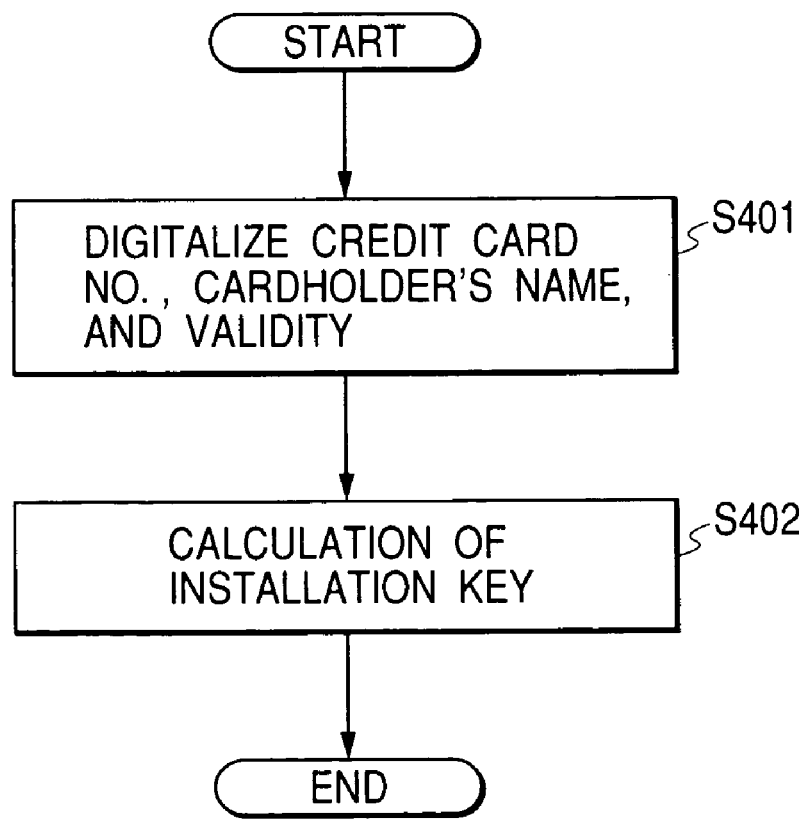
FIG. 4 is a flowchart which shows the procedures of installing a software.

FIG. 4 is a flowchart which shows in detail the procedure of the installation key preparation in the step S204 in FIG. 2. As shown in FIG. 4, the hashing technique is used for preparing the installation keys for the present embodiment.

In step S401, the credit card number, the alphabetically expressed name, and the validity are digitized to produce an integer of 32 digits. Of the 32 digits, the high order 16 digits indicate the credit card number, and the following 12 digits are allocated for producing the mane, and further, the following two digits are used for the indication of the month in which the validity expires. The last two digits stand for the last two digits of the dominical year in which the validity expires. If the holder's name is "X Y Z", for example, the hexadecimal ASCII code thereof is "5820595A". This code stands for "1478515034" when decimalized, and then, the aforesaid 12 digits become "001478515034".

Therefore, assuming that the credit card number is "1234-5678-9012-3456", the holder's name is "X Y Z", and the validity expires in February, 2010, the integer of 32 digits is obtained as follows:

"12345678901234560014785150340210".

In step S402, the above-mentioned integer of 32digits is given a designated calculation to work out a 36-adic number of eight digits. Form this 36-adic number, the check sum of four-digit 36-adic number is produced. Then, from both of them, an installation key of 12 digits is produced, which is dedicated for the use of that particular user. Here, at first, the remainder is obtained by dividing the integer of 32 digits by the integer of 12 digits "123456789013" which is prepared in advance for the system, and then, the remainder thus obtained is converted into a 36-adic number. This divisor is used only for reducing the digit numbers. Therefore, the divisor is not necessarily limited to this value. It is good enough if only one designated value should be prepared for the system use here.

Now, the 36-adic number is such as to use 0 to 9 and A to Z as a numerical value, respectively, and from 0 to 9 are the same as the decimal numbers, and a letter A indicates 10 in terms of the decimal number. Thus, a letter Z indicates 35 likewise. Now, for example, 10 in terms of the 36-adic number is equivalent to 36 in terms of the decimal number. Then, ZZ of 36-adic number corresponds to 1,295 in terms of the decimal number. Therefore, the aforesaid remainders represent "122463224728" in decimal, and then, "1K9BFWYQ" is obtained if expressed in the 36-adic number.

This 36-adic number is divided into the higher order four digits of "1K9B" and the lower order four digits of "FWYQ", and the value of each digit is added to each other. Then, the value thus obtained by addition is given a check sum calculation so that each of them becomes a multiple of 36. For example, since the most significant digit is 1 and 15 (F corresponds to 15) in terms of decimal number, the check sum thereof is 20 in decimal, that is, K in 36-adic number. Likewise, K is induced from the K and W, J from 9 and Y, and 9 from B and Q, hence obtaining a check sum code of "KKJ9" in four characters (digits).

In continuation, this check sum code of "KKJ9" is added to the head of the aforesaid 36-adic number of "1K9BFWYQ" in order to obtain the installation keys of "KKJ91K9BFWYQ". Since this value is obtained from the credit information of 32 digits the amount of which is compressed to 12 digits using the remainders of a division, it is impossible to induce the original credit information having a high secrecy, such as a credit card number, the holder's name, among some others, even if a third party should steal this installation key on the network. In this way, the leakage of personal information can be prevented.

Figure 5:
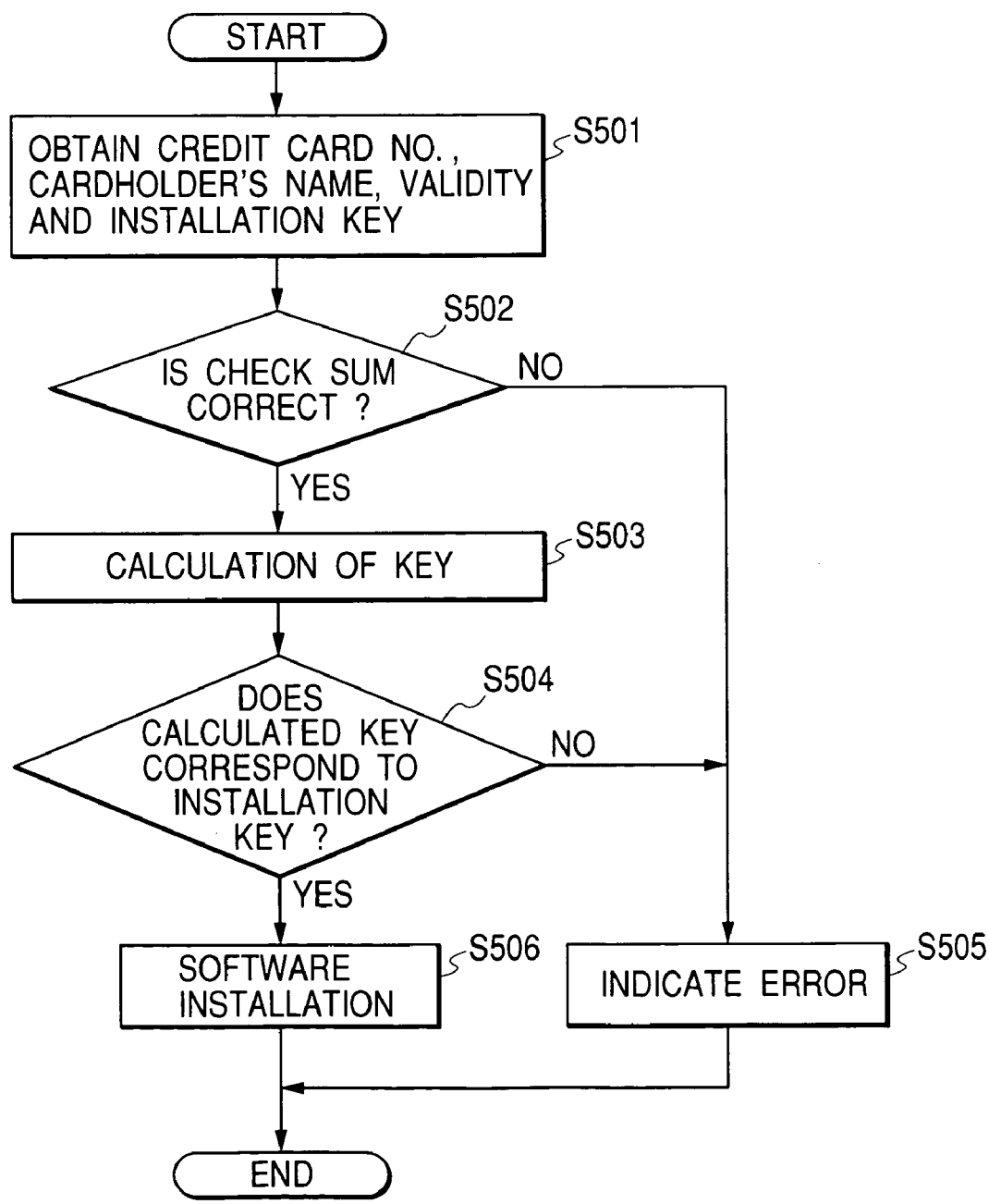
FIG. 5 is a flowchart which shows the procedures of uninstalling a software.

FIG. 5 is a flowchart which shows the procedures of installation of a software using an installer in the step S207 in FIG. 2.

The user uses the computer system 10 to inputs the credit card information, such as the installation key 31, the credit card number 32, the credit card holder's name 33, and the validity thereof 34, along with the installation input display on a screen 300 (see FIG. 3), and clicks the execution button 35. Then, the installer obtains these items of information in step S501.

In step S502, whether or not the check sum is correct for the installation key is determined. If there is no agreement, it is interpreted that the user is illegal, who is not authorized. The process proceeds to step S505 where an error indication (not shown) is displayed on a screen, and the precess terminates. If agreed, it is determined that the use is correctly authorized, and the process proceeds to step S503. In the step S503, the installation key is worked out in the same procedures as in the step S402 as described above, beginning with the credit card number, the credit card holder's name, and the validity obtained in the step S501.

In the step S504 that follows, the installation key obtained in the step S501 is compared with the installation key obtained by calculation in the step S503, and if there is no agreement, it is interpreted that the use is illegal, who is not authorized, and the process proceeds to step S505 where an error is displayed (not shown) on a screen, and the process terminates. While the non-existent illegal user is excluded by making such confirmation as this, the correct user who is in actual existence is acknowledged if these installation keys are in agreement, and the process proceeds to step S506 where the installation of the software begins. When the installation is completed, the process terminates.

Figure 6:
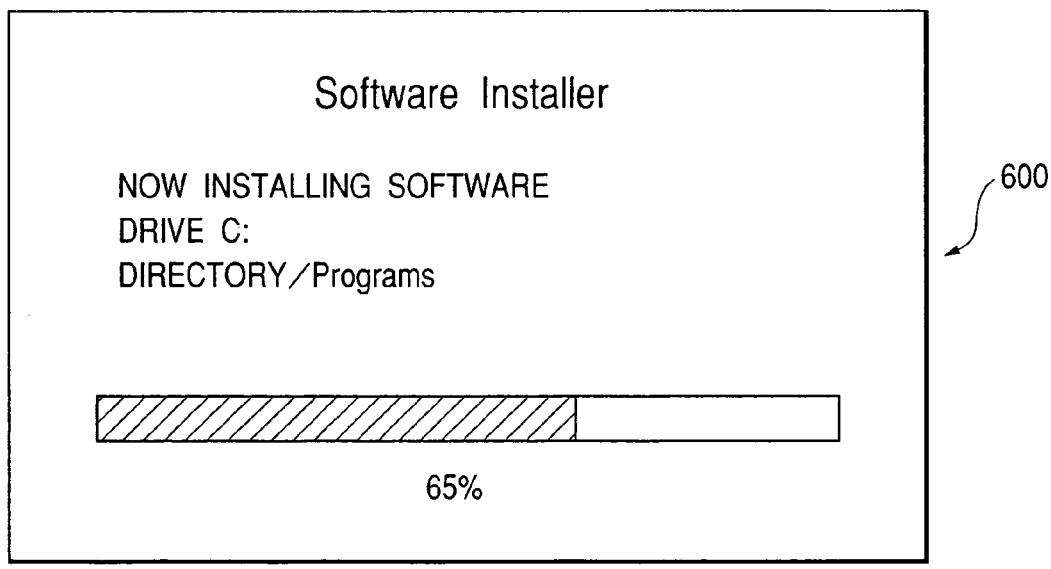
FIG. 6 is a view which shows the execution of installation displayed on a screen when a software is installed.

When the step S506 is executed to enable the installer to install the software, the screen 600 shown in FIG. 6 appears on the display device of the computer system 10 to indicate that the installation is being executed.

In accordance with the present embodiment, the sales company issues an installation key after having inquired the credit company of the approved ID of the credit card held by the user and the related information currently available. There is no need for keeping the approved ID on software. Then, it is possible to compare the approved ID and installation key at the time of actuating the installer in order to determine the legality of software use. Therefore, the legality of the use can be determined satisfactorily, while it becomes unnecessary to take any key issuance procedures anew by the same user who should carry out the same installation on another computer due to the trouble or the like that necessitates the original computer to be replaced. In this way, it is possible to provide an installer capable of avoiding problems taking place when a software is processed or analyzed.

In accordance with the embodiment described above, the ID information of the user of a software is notified to the sales company who communicates with an authorizing agency to confirm whether or not the user who has notified the ID information is a legitimate user. If affirmative, the sales company produces an installation key uniquely corresponding to the user based on the ID information thus verified, and issues the installation key to the user. Therefore, the illegal use of the software by any non-existent user can be prevented, and even if the computer becomes out of order, there is no need for the reissuance of the installation key. The same user can use on another computer the installation key thus issued for installation of such software.

Also, the installation key is produced by carrying out a designated operation on either one of the credit card number, the holder's name, and the validity of use as ID information, thus preventing the ID information from being known to the third party.

In this respect, the present invention may be applicable to the system which is formed by a plurality of equipment (such as a computer main body, an interface equipment, a display, among some others) or applicable to the system formed by single equipment.

Also, the present invention is construed to include in the scope thereof the programming codes of a soft wafer which implement the functions of the embodiment described earlier, and which are provided for a computer in an apparatus or a system connected with various devices arranged for the implementation thereof, hence operating each of the devices by the computer (CPU or MPU) in such system or apparatus in accordance with the programming codes thus stored. In this case, the aforesaid programming codes themselves of the software implement the functions of the embodiment. Therefore, the programming codes themselves, means for supplying such programming codes to a computer, that is, the storage medium that has stored the programming codes, for example, are construed to constitute the present invention.

As a storage medium for storing such programming codes, it is possible to use a floppy disc, a hard disc, an optical disc, an optomagnetic disc, a CD-ROM, a CD-R, a magnetic tape, a non-volatile memory card, a ROM, or the like, for example.

Also, the present invention is construed as a matter of course to include not only the case where the functions of the aforesaid embodiment is implemented by a computer that executes the programming codes supplied thereto, but also, the case where the aforesaid embodiment is implemented by such programming codes in corporation with the operating system (OS) that operates on the computer or with other application software or the like.

Further, the present invention is of course construed to include the case where the programming codes thus supplied are once stored on the expanded functional board or on the memory provided for the expanded functional unit connected with the computer, and then, the actual processes are executed partly or totally by the CPU or the like provided for such expanded functional board or functional storage unit in accordance with the instructions contained in the programming codes, hence implementing the functions of the aforesaid embodiment.

When the invention hereof is made applicable to any one of the aforesaid storage media, it should be good enough to store programming codes in the storage thereof corresponding to the flowcharts described earlier.

Although the present invention has been described in its preferred from with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A method of allowing an installation of software on a computer of a user by an installer executed in the computer of the user, comprising the steps of:

transmitting information regarding a credit card of the user to a computer of a sales company;

transmitting the information regarding the credit card of the user and a price of the software from the computer of the sales company to a computer of a credit company so as to request a confirmation of use of the credit card specified by the information regarding the credit card of the user;

confirming the use of the credit card of the user and settling an account by the computer of the credit company in accordance with the information regarding the credit card of the user, the price of the software and a limit price set for the card, so as to send a result of the confirmation and a remittance for the price to the computer of the sales company;

issuing, by the computer of the sales company, a first installation key uniquely assigned to the user on the basis of the information regarding the credit card of the user, and transmitting the first installation key to the computer of the user if the use of the credit card of the user is confirmed;

executing the installer to display a form to newly request the user to input the first installation key and information regarding the credit card of the user in the installer;

producing, by the installer, a second installation key from the information of the credit card of the user input in the step of executing the installer in order to obtain a comparison result by comparing the first installation key with the produced second installation key; and installing the software on the computer of the user by the installer if the first installation key corresponds to the second installation key in the comparison results.

2. A method according to claim 1, wherein the information regarding the credit card of the user is credit information of the user issued by the credit company to the user, and the first installation key is produced by the computer of the sales company in said step of issuing the first installation key by operating a designated calculation in accordance with the credit card information.

3. A method according to claim 2, wherein the information regarding the credit card of the user contains a credit card number, a card holder's name, and validity of use, and the designated calculation is operated at least for one of the credit card number, the card holder's name, and the validity of use in order to produce the first installation key.

* * * * *

UNITED STATES PATENT AND TRADEMARK OFFICE
CERTIFICATE OF CORRECTION

PATENT NO. : 7,058,604 B2 Page 1 of 1
APPLICATION NO. : 09/909820
DATED : June 6, 2006
INVENTOR(S) : Tsuneaki Kurumida It is certified that error appears in the above-identified patent and that said Letters Patent is hereby corrected as shown below:

COLUMN 1:
Line 43, "Third" should read -- A third --.

COLUMN 2:
Line 11, "form" should read -- from --.

COLUMN 3:
Line 15, "installation" (first occurrence) should read -- an installation --; and
Line 63, "describe" should read -- described --.

COLUMN 4:
LIne 2, "instal" should read -- install --;
Line 9, "an" should be deleted; and
Line 38, "comply" should read -- company --.

COLUMN 5:
Line 2, "mane," should read -- name, --;
Line 15, "32digits" should read -- 32 digits --;
Line 17, "Form" should read -- From --; and
Line 65, "inputs" should read -- input --.

COLUMN 6:
Line 9, "precess" should read -- process --.

COLUMN 7:
Line 29, "corporation" should read -- cooperation --; and
Line 47, "from" should read -- form --.

Signed and Sealed this

Third Day of July, 2007

JON W. DUDAS
*Director of the United States Patent and Trademark Office*